(12) United States Patent
Ueki et al.

(10) Patent No.: US 8,818,111 B2
(45) Date of Patent: Aug. 26, 2014

(54) AGE ESTIMATION APPARATUS, AGE ESTIMATION METHOD, AND AGE ESTIMATION PROGRAM

(75) Inventors: Kazuya Ueki, Tokyo (JP); Masashi Sugiyama, Tokyo (JP); Yasuyuki Ihara, Tokyo (JP)

(73) Assignees: NEC Soft, Ltd., Tokyo (JP); Tokyo Institute of Technology, Tokyo (JP)

( * ) Notice: Subject to any disclaimer, the term of this patent is extended or adjusted under 35 U.S.C. 154(b) by 85 days.

(21) Appl. No.: 13/263,059

(22) PCT Filed: Apr. 14, 2010

(86) PCT No.: PCT/JP2010/056690
§ 371 (c)(1),
(2), (4) Date: Nov. 9, 2011

(87) PCT Pub. No.: WO2010/125916
PCT Pub. Date: Nov. 4, 2010

(65) Prior Publication Data
US 2012/0051629 A1    Mar. 1, 2012

(30) Foreign Application Priority Data

Apr. 28, 2009   (JP) .................................. 2009-109680

(51) Int. Cl.
*G06K 9/62*   (2006.01)

(52) U.S. Cl.
USPC ........... 382/224; 382/225; 382/226; 382/227; 382/228; 382/229; 382/230; 382/231; 382/218; 382/181; 382/182; 382/190; 382/195

(58) Field of Classification Search
CPC ............... G06F 17/30247; G06F 17/30268; G06F 17/30707; G06K 2009/00322
USPC .......... 382/224–231, 218, 181, 182, 190, 195
See application file for complete search history.

(56) References Cited

U.S. PATENT DOCUMENTS

| | | | | |
|---|---|---|---|---|
| 5,781,650 | A | * | 7/1998 | Lobo et al. ................... 382/118 |
| 6,625,303 | B1 | * | 9/2003 | Young et al. .................. 382/132 |
| 2010/0046842 | A1 | * | 2/2010 | Conwell ....................... 382/218 |

FOREIGN PATENT DOCUMENTS

| | | |
|---|---|---|
| JP | 2009086901 A | 4/2009 |
| JP | 2009514110 A | 4/2009 |

(Continued)

OTHER PUBLICATIONS

M. Miya et al., "Class—Distance Weighted Locality Preserving Projection and its Application to Facial image Based Age Classification", IEICE Technical Report, PRMU2007-48 to 89 2007 pp. 83-88.*

(Continued)

*Primary Examiner* — Mike Rahmjoo
(74) *Attorney, Agent, or Firm* — Sughrue Mion, PLLC

(57) ABSTRACT

Provided are an age estimation apparatus, an age estimation method, and an age estimation program capable of reducing the labor of labeling the image data used for age estimation. An age estimation apparatus for estimating an age of a person on image data includes a dimension compression unit for applying dimension compression to the image data to output low dimensional data; a clustering unit for performing clustering of the low dimensional data outputted; a labeling unit for labeling representative data of each cluster among the low dimensional data clustered; and an identification unit for estimating an age of a person on the basis of a learning result using a feature amount contained in labeled low dimensional data and unlabeled low dimensional data.

15 Claims, 4 Drawing Sheets

(56) References Cited

FOREIGN PATENT DOCUMENTS

| KR | 10-2006-0034064 A | 4/2006 |
| KR | 10-2006-0054477 A | 5/2006 |
| KR | 10-2006-0120233 A | 11/2006 |
| KR | 10-2008-0031031 A | 4/2008 |

OTHER PUBLICATIONS

International Search Report for PCT/JP2010/056690 mailed May 18, 2010.
Y.Fu et al., "Estimating human age by manifold analysis of face pictures and regression on aging features", ICME 2007, Proceedings of the IEEE Multimedia and Expo, 2007, pp. 1383-1386.
D. Ikeda et al., "Semi-supervised Learning for Blog Classification", IPSJ SIG Technical Report, 2008, pp. 59-66.
Korean Office Action for KR Application No. 10-2011-728324 dated on Jun. 28, 2013 with English Translation.
Ueki et al., "Class Distance Weighted Locality Preserving Projection for Automatic Age Estimation", Biometrics: Theory, Applications and Systems, 2008, BTAS, IEEE International Conference, pp. 1-5.
Chinese Office Action dated Aug. 28, 2013 issued in corresponding Chinese Application No. 201080019028.X.

* cited by examiner

AGE ESTIMATION APPARATUS, AGE ESTIMATION METHOD, AND AGE ESTIMATION PROGRAM

TECHNICAL FIELD

The present invention relates to an apparatus, a method, and a program for estimating a human age.

BACKGROUND ART

For example, as a method of mechanically estimating an age of human using an identification device or the like on the basis of human facial image data, for example, there is a method of identifying an age itself, which is the method of estimating an age as a continuous quantity (the method in which age estimation is performed as a regression problem). Such a method is disclosed in Non-Patent Document 1, for example. Since continuous ages can be expressed, it has been demonstrated by experiments that the contradiction less arise as compared to the method in which age estimation is performed as an identification problem, and an age can be recognized with high accuracy.

The regression problem can be obtained by solving the difference between an estimated age (an age which is estimated) and a correct age (an age which is correct) as a problem of minimization. Specific examples include the multiple linear regression analysis and the (kernel) ridge regression. These methods execute learning so as to reduce the mean square error or the mean absolute error between the estimated age and the correct age.

FIG. 5 shows an example of the age estimation apparatus that performs age estimation as a regression problem. Generally, the image data to be inputted (for example, facial image data) is high dimensional data such as the number of pixels or the number of pixels×3 (color values of R, G, and B). Therefore, in a dimension compressor 61, features are extracted from image data such that age information is emphasized and unnecessary information (lighting condition, facial angle, and the like) is deleted. Thereby, the image data is converted into low dimensional data from high dimensional data. Here, in the dimension compressor 61, for example, methods such as the principal component analysis (PCA), the linear discriminant analysis (LDA), and the locality preserving projection (LPP) are employed. This processing is also referred to as the "feature selection" and "dimension compression". Then, an identification device 62 estimates an age on the basis of the features extracted.

In order to estimate an age with an age estimation apparatus 60 on the basis of the image data, learning of the dimension compressor 61 and the identification device 62 is required. That is, plural image data of people whose correct ages (actual ages or perceptual ages (i.e., apparent age)) are known are inputted to the dimension compressor 61, and each data is evaluated by the methods such as the N-fold cross validation and the leave-one-out cross-validation. On the basis of this evaluation result, an output of the identification device 62 is adjusted so that the error (the difference between the estimated age and the correct age) would be reduced. For the learning of the identification device 62, the methods such as the linear regression, the multiple regression, the ridge regression, and the neural network are applied.

By repeating similar procedures while changing the type and combination of features, the extraction method (i.e., a parameter used for dimension compression), and the like, a parameter and a model are selected so that the error would be reduced.

RELATED ART DOCUMENT

Non-Patent Document

Non-Patent Document 1: Y. Fu, Y. Xu, and T. S. Huang. Estimating human age by manifold analysis of face pictures and regression on aging features, Proceedings of the IEEE Multimedia and Expo, pp. 1383-1386, 2007

SUMMARY OF INVENTION

Problem to be Solved by the Invention

In order to achieve age estimation with high accuracy in the age estimation apparatus shown in FIG. 5, collection of a large quantity of image data is required. However, there is a problem that an operation (labeling) of manually applying correct age data to each of the large quantity of image data is required.

The present invention is made in view of the foregoing problems, and is intended to provide an age estimation apparatus, an age estimation method, and an age estimation program capable of reducing the labor of labeling the image data used for age estimation.

Means for Solving Problem

In order to achieve the aforementioned object, the age estimation apparatus of the present invention is an age estimation apparatus for estimating an age of a person on image data including: a dimension compression unit for applying dimension compression to the image data to output low dimensional data; a clustering unit for performing clustering of the low dimensional data outputted; a labeling unit for labeling representative data of each cluster among the low dimensional data clustered; and an identification unit for estimating an age of a person on the basis of a learning result using a feature amount contained in labeled low dimensional data and unlabeled low dimensional data.

The age estimation method of the present invention is an age estimation method for estimating an age of a person on image data including: a dimension compression step for applying dimension compression to the image data to output low dimensional data; a clustering step for performing clustering of the low dimensional data outputted; a labeling step for labeling representative data of each cluster among the low dimensional data clustered; and an identification step for estimating an age of a person on the basis of a learning result using a feature amount contained in labeled low dimensional data and unlabeled low dimensional data.

The program of the present invention is an age estimation program for estimating an age of a person on image data, wherein a computer is caused to execute dimension compression processing of applying dimension compression to the image data to output low dimensional data; clustering processing of performing clustering of the low dimensional data outputted; labeling processing of labeling representative data of each cluster among the low dimensional data clustered; and identification processing of estimating an age of a person on the basis of a learning result using a feature amount contained in labeled low dimensional data and unlabeled low dimensional data.

Effects of the Invention

According to the present invention, the labor of labeling the image data used for age estimation can be reduced.

DESCRIPTION OF EMBODIMENTS

First Embodiment

The First Embodiment in which the present invention is implemented suitably will be described.

Figure 1:
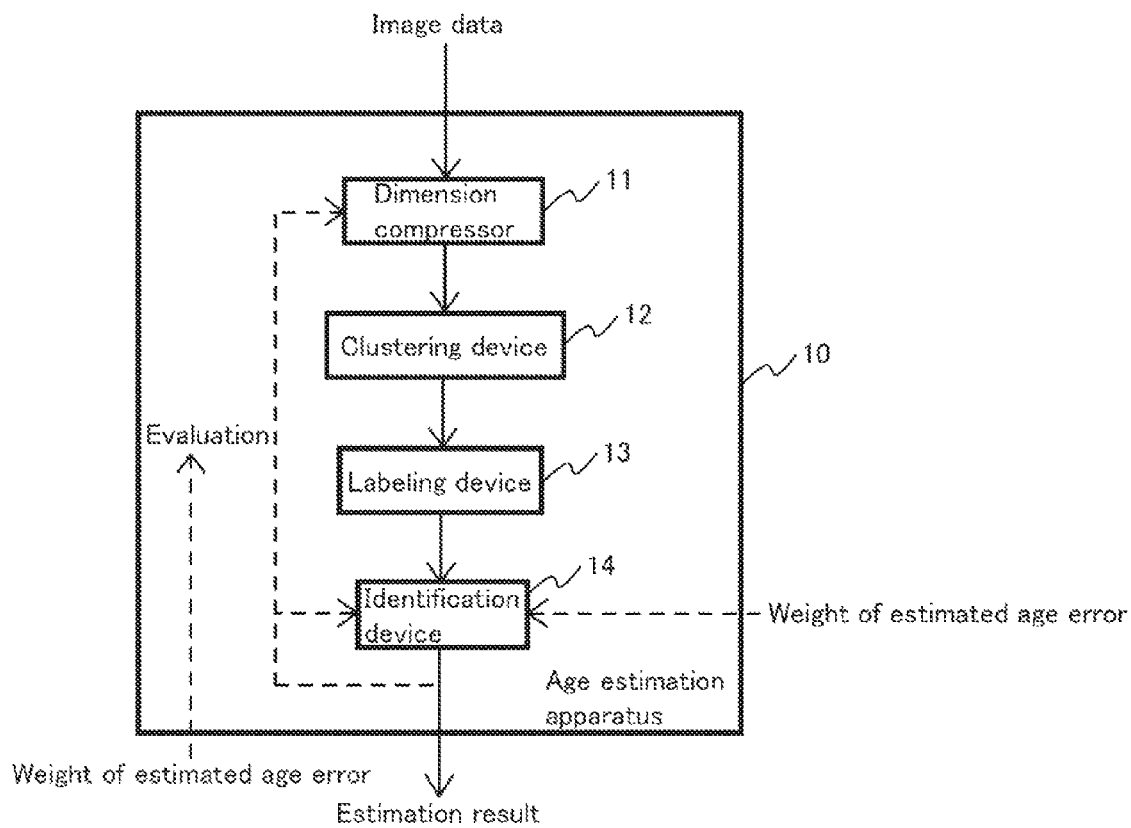
FIG. 1 is a view showing the configuration of the age estimation apparatus according to the Embodiment of the present invention.

FIG. 1 shows the configuration of the age estimation apparatus according to this Embodiment. An age estimation apparatus 10 includes a dimension compressor 11, a clustering device 12, a labeling device 13, and an identification device 14.

For example, image data of a person (for example, human facial image data) is inputted to an age estimation apparatus 10 as training data (learning data). This image data is high dimensional data having dimensions of the number of pixels× the number of luminance levels.

The dimension compressor 11 performs dimension compression (dimension reduction) when high dimensional image data is inputted thereto. That is, the dimension compressor 11 extracts features from image data such that age information is emphasized and unnecessary information (lighting condition, facial angle, and the like) is deleted. For example, the features are extracted by the methods such as PCA, LDA, and LPP. Thereby, the high dimensional image data is converted into low dimensional image data (low dimensional data).

Next, the clustering device 12 performs clustering of the low dimensional data obtained by the dimension compression. As the clustering, for example, the k-means clustering can be employed.

Next, only representative data among the low dimensional data subjected to clustering is labeled by the labeling device 13 (application of correct age data). For example, the data closest to the average value of the data belonging to each cluster is regarded as representative data, and the representative data is labeled by the labeling device 13; or the data randomly selected from each cluster is regarded as representative data, and the representative data is labeled by the labeling device 13. Further, plural representative data may be labeled by the labeling device 13. Hereinafter, the labeled data is referred to as the labeled training data (supervised data), and the unlabeled data is referred to as the unlabeled training data (unsupervised data).

In the image data inputted to the age estimation apparatus 10, it is considered that parts in which the occurrence probability of the data is locally increased are scattered depending on various variations of the facial feature and the difference in the photographing environment. In the case where the Gauss kernel is used for the regression model as will be described later, the distance between the training data and the test data gives important information. Therefore, as described above, to label a part of the training data in which the occurrence probability of the data is increased can be the effective method.

In this manner, according to this Embodiment, labeling is performed not with respect to all the image data inputted but with respect to a part of data (representative data). Therefore, according to this Embodiment, the labor of labeling can be reduced.

The identification device 14 estimates an age on the basis of the features extracted by the dimension compressor 11.

As the dimension compressor 11 and identification device 14, those having common configurations can be employed. However, the feature extraction method (a parameter used for the dimension compression) in the dimension compressor 11 and the type of the identification device 14 are decided on the basis of the evaluation result obtained in consideration of the "weight" that shows the degree of seriousness of the estimated age error (the difference between an estimated age and a correct age). Further, the concept of the weight is introduced into the content of the learning of the identification device 14. Here, reasons for introducing the concept of the weight are described as follows.

Figure 5:
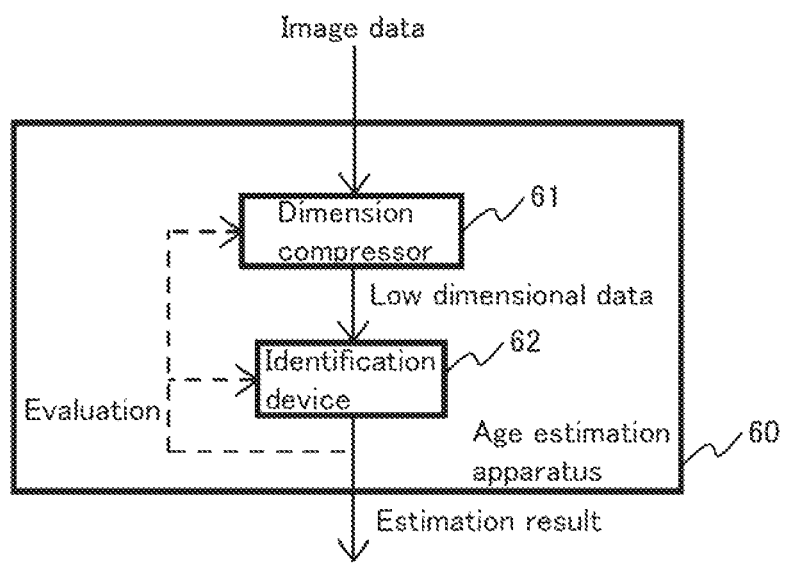
FIG. 5 is a view showing an example of the age estimation apparatus that performs age estimation as a regression problem.

As described above, with a conventional age estimation apparatus (for example, the one shown in FIG. 5), on the basis of the facial image data, by repeating the procedures while changing the type and combination of the feature and the extraction method (i.e., a parameter used for the dimension compression), a parameter and a model are selected such that the error would be reduced. However, since the distances between ages are different depending on intended ages, use of the mean square error and mean absolute error between the estimated age and the correct age causes the decrease in accuracy of age recognition. For example, in the case where there is the 10 years old difference (error) between the correct age and the recognition age, the degree of seriousness should be different between the case where the age of 5 is mistaken for the age of 15 and the case where the age of 35 is mistaken for the age of 45. In other words, even in the error of the same 10 years old difference, mistaking the age of 5 for the age of 15 means mistaking a kindergarten child for a junior high school student or a high school student, and this is very serious error in the human sense. On the other hand, since the facial feature of a 35 years old human is very similar to that of a 45 years old human, the difference therebetween often cannot be identified even by human. Therefore, mistaking the age of 35 for the age of 45 is not as serious as mistaking the age of 5 for the age of 15.

The appearance of human sharply changes in the stage of youth such as the stage of growth, and gently changes after becoming an adult. Therefore, even with the error of the same age difference, a problem arises if the evaluations are made with the same indicator.

Figure 4:
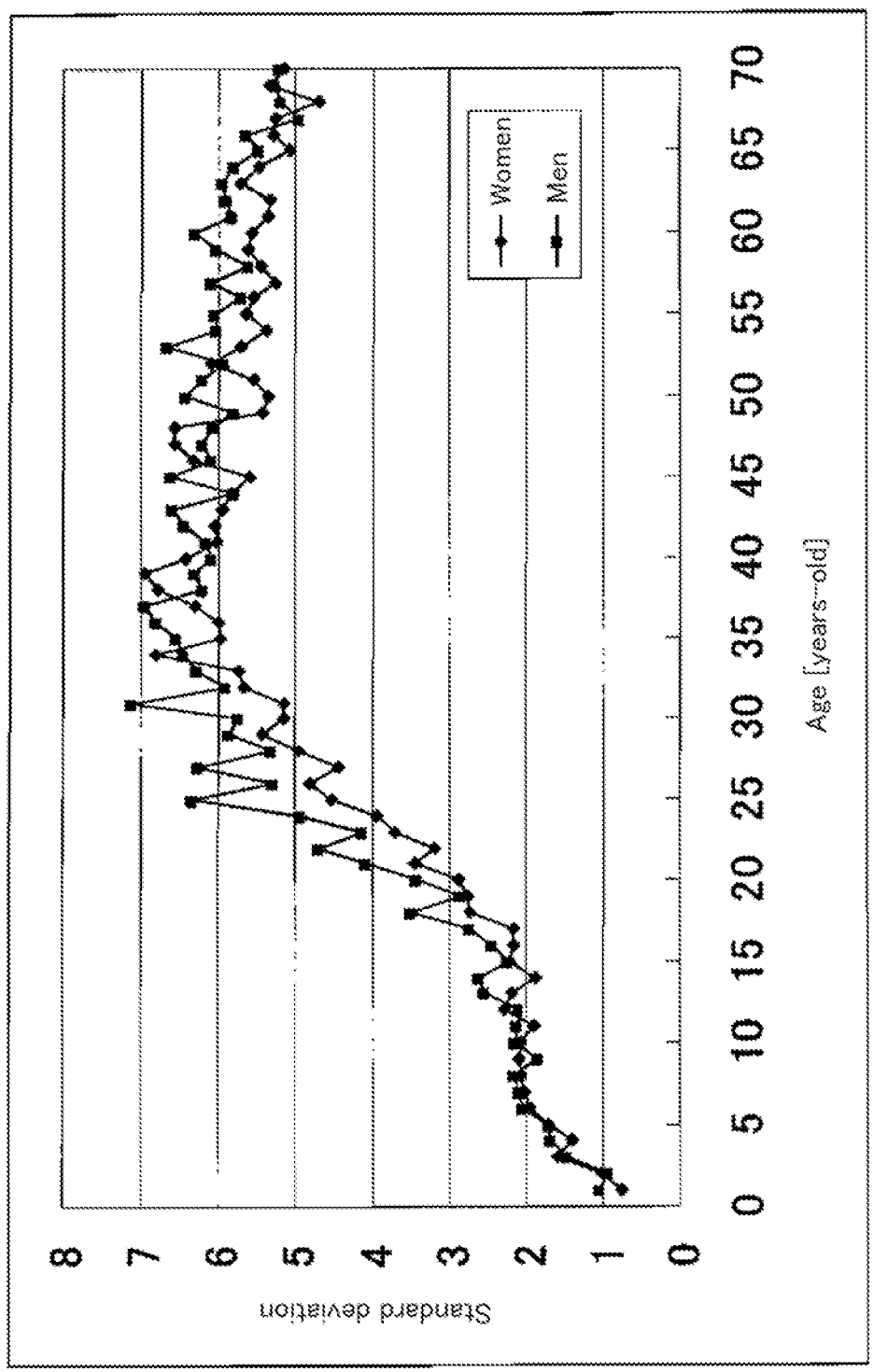
FIG. 4 is a view showing an example of the result of the age estimation by estimators for every age on the basis of facial images.

FIG. 4 shows an example of the result of the age estimation by estimators for every age on the basis of facial images. The graph shows "the standard deviation of the estimated age (variation degree)" in the case of classifying, for every age, the result of estimation of an age of a person whose correct age is known. The horizontal axis indicates the correct age (true age) of the subject and the vertical axis shows the standard deviation of the estimation error. Here, the correct age (true age) is the average value of the ages estimated by the estimators. Since the standard deviation of the young adults is small, it can be understood that most estimators estimate young adults as similar ages.

Therefore, if the data of a young adult is mistakenly recognized as an adult in an age estimation apparatus, this greatly differs from the result perceived by human.

Here, this Embodiment achieves the feature extraction capable of obtaining a recognition result closely matching a human recognition result by introducing the concept of the weight into the content of the learning of the identification device 14.

Further, the identification device 14 creates an exact model (model for age estimation) utilizing not only the labeled training data but also the unlabeled training data.

Figure 3:
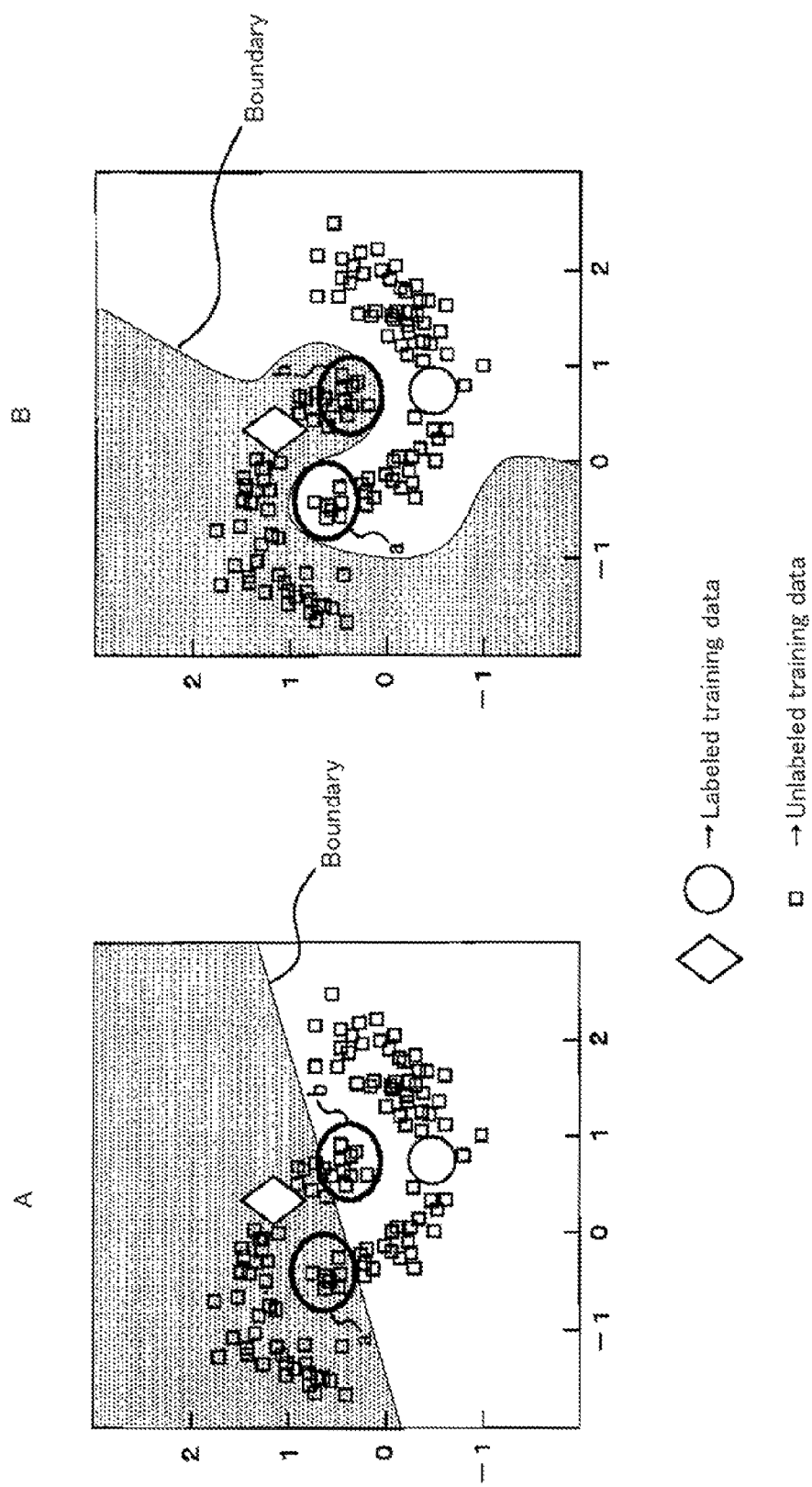
FIG. 3 is a view showing an example of the data distribution in a model of the age estimation apparatus according to the Embodiment of the present invention.

Here, an example of the model created in this Embodiment will be described with reference to FIGS. 3A and 3B. FIG. 3A shows the data distribution of the model before learning (initial status) in the identification device 14. As shown in FIG. 3A, the model before learning includes two types of data, which is the labeled training data and the unlabeled training data, and these data are separated by a boundary. That is, in FIG. 3A, the unlabeled training data within the range of a is classified into the labeled training data indicated by a diamond and the unlabeled training data within the range of b is classified in to the labeled training data indicated by a circle. In this Embodiment, the model shown in FIG. 3A is converted into an exact model shown in FIG. 3B, for example, by the semi-supervised learning that will be described later. The boundary of the model shown in FIG. 3B is deformed as compared to that of the model shown in FIG. 3A, and the unlabeled training data within the range of a is classified into the labeled training data indicated by a circle and the unlabeled training data within the range of b is classified into the labeled training data indicated by a diamond.

Hereinafter, the age estimation method by the semi-supervised learning utilizing not only the labeled training data but also the unlabeled training data will be described. This method is the method in which the unlabeled training data is utilized for the regularized least squares to a kernel function (the method of assigning a weight to the regularized least squares to a kernel function, the kernel regularized weighted least squares: KRWLS) and the graph of the whole training data and the structure of the manifold are used effectively. The method is intended to improve the accuracy of the age estimation by smoothing the regression model using the information such as the graph and the structure of the manifold (expression (3) that will be described later). Further, the weight of age is considered in the least squares. From such characteristics, this method can be called the semi-supervised kernel regularized weighted least squares (SKRWLS).

Here, considered is the problem of the semi-supervised learning of predicting a true age y* of test data, which is the extraction source of the feature vector x, with y*=f(x) under the application of one labeled training data $(x_i, y_i)$ [$x_i$ is an explanatory variable (facial feature <this may also be referred to as a feature vector>), $y_i$ is an objective variable (age), i is 1 to l] and u-unlabeled training data $(x_i)$ [$x_i$ is an explanatory variable (facial feature <this may also be referred to as a feature vector>), i is 1+l to 1+u]. In this Embodiment, the age estimation function f(x) is modeled by the linear combination of the positive definite kernel k(x, x'). This is expressed by the following expression (1). The expression (1) is the expression for outputting the conclusive age. The age is outputted by obtaining an optimal solution during the learning (details will be described later) and then substituting the obtained optimal solution into the expression (1).

$$f_\alpha(x) = \sum_{i=1}^{l} \alpha_i k(x_i, x) + \sum_{i=l+1}^{l+u} \alpha_i k(x_i, x) \quad (1)$$

In the case where the number of training data l or u is large, not all the kernel function k $(x_i, x)$ [i is 1 to l+u] but the subset thereof may be used. In the identification device 14, learning of the parameter shown by the following expression (2) (matrix with l+u rows and 1 column with $\alpha_1$ to $\alpha_{l+u}$ as a component) is performed such that the following expression (3) is minimized. The expression (3) is the expression of defining the error (penalty). This Embodiment is intended to minimize the error (penalty).

$$\alpha = (\alpha_1, \ldots, \alpha_{l+u})^T \quad (2)$$

$$L(\alpha) = \frac{1}{l} \sum_{i=1}^{l} \frac{(y_i - f\alpha(x_i))^2}{w(y_i)^2} + \lambda \|\alpha\|^2 + \frac{\mu}{4(l+u)} \sum_{i,j=1}^{l+u} (f(x_i) - f(x_j))^2 W_{ij} \quad (3)$$

w(y) is weighting function, $\|\cdot\|$ is Euclidean norm of $R^n$ $\lambda(>0)$ in the expression (3) is a regularization parameter that is introduced for preventing overfitting; and the second term of the expression (3) is a correction term (term for calculating the size of the parameter obtained) for preventing overfitting. The first term in the expression (3) is the term for calculating the error of the age recognition of the training data. The third term in the expression (3) is the term for calculating the value of the error of applying a large penalty to two ages having the large difference there between even if the distance between the two data (either labeled or unlabeled) is small (i.e., the term for performing learning so that the difference between two ages is reduced when the distance between the two data is small).

$\mu(>0)$ in the expression (3) is a parameter for adjusting the smoothing of the age estimation function f(x).

$W_{i,j}$ in the expression (3) expresses the degree of similarity between $x_i$ and $x_j$ ($W_{i,j}$ increases as the distance between two data decreases). An example of $W_{i,j}$ is shown by the following expression (4).

$$W_{ij} = \begin{cases} \exp\left(-\frac{\|x_i - x_j\|^2}{2t^2}\right) & \text{wherein } x_j \text{ is within } k - \text{neighborhood of } x_i \\ & \text{or} \\ & x_i \text{ is within } k - \text{neighborhood of } x_j \\ 0 & \text{otherwise} \end{cases} \quad (4)$$

The weighting function w (y) in the expression (3) is a function that expresses the degree of seriousness of an estimated age error for every age. The smaller the value (weight) of the w (y) is, the more serious the estimated age error.

An optimal solution in the expression (3) can be obtained by the following expression (5).

$$\text{Optimal solution } \alpha = \underset{\alpha}{\operatorname{argmin}} L(\hat{\alpha}) = \left(K^T D K + l\lambda I_{l+u} + \frac{l\mu}{(l+u)^2} K^T L K\right)^{-1} K^T D y \quad (5)$$

K Kernel matrix having $k(x_i, x_j)$ as (i,j)-component
$K^T$ Transposed matrix of K D $l+u$ – dimensional diagonal matrix having $\frac{1}{w(y_i)^2}$ as (i, i)-diagonal component when $1 \leq i \leq l$ and having 0 as (i,i)-diagonal component when $l < i \leq l+u$
L Laplacian matrix having $L_{i,j}$ as (i,j)-component $$\left(L_{ij} = \delta_{ij} \sum_{j=1}^{l+u} W_{ij} - w_{ij}, \delta_{ij} \text{ is delta of Kronecker}\right)$$

$I_{l+u}$ l+u-dimensional unit matrix
y l+u-dimensional vector having $y_i$ as i-component when $1 \leq i \leq l$ and having 0 as i-component when $l < i \leq l+u$ In the case where the number of training data l+u is large, since the calculation of the parenthesized part in the expression (5) is difficult, an optimal solution may be obtained by reducing the number of kernel functions used or by conducting a numerical calculation by the gradient method.

By using the optimal solution obtained by the expression (5) as a parameter, the ages of m-test data newly inputted to the age estimation apparatus 10 are predicted. Here, the test data and the true age thereof are expressed as follows.

Test data $\{\tilde{x}_i\}_{i=1}^m$

True age of test data $\{\tilde{y}_i^*\}_{i=1}^m$

The evaluation of the generalization capability is made according to the following expression (6) on the basis of the weighted mean square error (WMSE). The expression (6) is an expression of defining the error of the test data (expression of calculating the error of the test data).

$$WMSE = \frac{1}{m} \sum_{i=1}^{m} \frac{(\tilde{y}_i^* - f_{\hat{\alpha}}(\tilde{x}_i))^2}{w(\tilde{y}_i^*)^2} \quad (6)$$

At the time of deciding the feature extraction method in the dimension compressor 11 and deciding the type of the identification device 14, by performing the N-fold cross validation and the leave-one-out cross-validation using the learning data and test data, the evaluation is made on the basis of the WMSE of the expression (6), and the method and the type that achieve the highest accuracy among the test data (the method and the type causing minimal error) are selected.

Here, an example of the experiment in which the number of labeled training data l is 200, the number of unlabeled training data u is 5000, the number of test data m is 1500, and the number of data of each age group is approximately equalized will be described. Here, considered is the case in which the Gauss kernel shown in the following expression (7) is used as the kernel function. The kernel width σ and the regularization parameter λ and μ are decided such that the test error becomes minimal.

$$k(x, x') = \exp\left(-\frac{\|x - x'\|^2}{2\sigma^2}\right) \quad (7)$$

Figure 2:
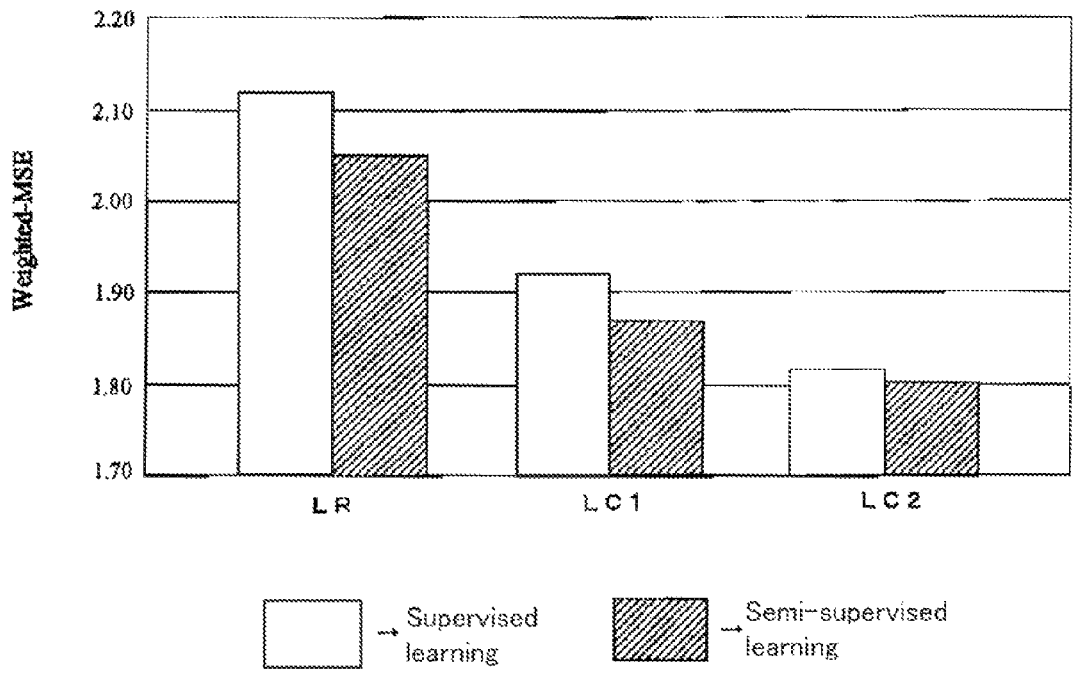
FIG. 2 is a graph showing an example of the result of the age estimation performed by the age estimation apparatus according to the Embodiment of the present invention.

For example, FIG. 2 shows the results of the supervised learning (learning using the labeled training data only) and the semi-supervised learning (learning using both of the labeled training data and the unlabeled training data) performed with respect to the women's facial feature vector assembly using 200 labeled training data obtained by the three methods described hereinbelow and 5000 unlabeled training data obtained randomly. The three methods are as follows.

LR: labeled training data is randomly obtained
LC1: labeled training data is obtained by calculating 200 clusters after performing dimension reduction to four-dimensional level by PCA
LC2: labeled training data is obtained by calculating 200 clusters after performing dimension reduction to ten-dimensional level by PCA With reference to FIG. 2, in the case where the supervised learning is performed using only three types of training data obtained by the three methods (LR, LC1, and LC2), the learning using the training data obtained by LC2 shows the most favorable effect.

Further, FIG. 2 shows that, in the case where the semi-supervised learning in which the unlabeled training data is utilized in addition to the aforementioned respective labeled training data is performed, the results are improved as compared to those of the supervised learning.

This tells that the method including steps of obtaining a small quantity of labeled training data by clustering and performing the semi-supervised learning utilizing the unlabeled training data in combination with the labeled training data is the most effective method.

In this manner, in this Embodiment, by utilizing the labeled training data in combination with the unlabeled training data and using the WMSE as the evaluation criteria, the feature extraction method and the identification device that output ages closely matching human perceptual ages can be selected.

Since the feature extraction method and the identification device are selected so as to output ages closely matching human perceptual ages, the age estimation apparatus according to this Embodiment can output the estimation result closely matching the human sense. Further, since an age is estimated with the identification device in which learning closely matching the human sense is performed, ages closely matching perceptual ages can be estimated.

In the aforementioned Embodiment, the weighting function based on the actual measurement data is used. However, the weighting function artificially made may be applied to the expressions (3), (5), and (6). Further, in the aforementioned Embodiment, just one weighting function is used. However, more than one weighting function may be used. In this manner, the weight of the age, the estimation accuracy thereof is desired to be improved, can be increased. Thereby, the estimation accuracy of the desired age can be improved.

The present invention is described with reference to the Embodiment. However, the present invention is not limited to the above-described Embodiment. Various changes can be made within the scope of the invention of the present application.

Operations in the aforementioned Embodiment can be performed also by hardware, software, or the composite structure thereof.

In the case where processing is carried out by software, the processing may be carried out by installing the program recording processing sequences into the memory of the computer incorporated in the dedicated hardware. Alternatively, the processing may be carried out by installing the program into a general-purpose computer capable of executing various processing.

For example, the program can be preliminarily recorded in a hard disk and a read only memory (ROM) serving as recording media. Alternatively, the program can be stored (recorded) temporarily or permanently in removable recording media such as a compact disc read only memory (CD-ROM), a magneto optical (MO) disk, a digital versatile disc (DVD), a magnetic disk, and a semiconductor memory. Such removable recording media can be provided as so-called generic software.

Besides installing the program into a computer from the aforementioned removable recording media, the program may be transferred without wire from the download site. Alternatively, the program may be transferred with wire via networks such as a local area network (LAN) and the internet. The computer can receive the program transferred and can install the program into a recording medium such as a hard disk incorporated therein.

The invention of the present application is described above with reference to the Embodiment. However, the invention of the present application is not limited to the above-described Embodiment. Various changes that can be understood by those skilled in the art can be made in the configurations and details of the invention within the scope of the invention of the present application.

This application claims priority from Japanese Patent Application No. 2009-109680 filed on Apr. 28, 2009. The entire subject matter of the Japanese Patent Applications is incorporated herein by reference.

EXPLANATION OF REFERENCE NUMERALS 10 age estimation apparatus
11 dimension compressor
12 clustering device
13 labeling device
14 identification device

The invention claimed is:

1. An age estimation apparatus of estimating an age of an object on image data, comprising:
a dimension compression unit of applying dimension compression to the image data to output low dimensional data;
a clustering unit of performing clustering of the low dimensional data outputted;
a labeling unit that applies a correct age to a part of each clustered low dimensional data to form labeled training data and unlabeling the low dimensional data other than representative data to form unlabeled training data; and
an identification unit for minimizing a value of a loss function to set a learned parameter, wherein
the loss function is a function defined on the basis of an error between an age which is correct in the labeled training data and an age estimated by the identification unit and a term which is increased when a difference between an age estimated from the labeled training data and an age estimated from the unlabeled training data is large even though a distance between the labeled training data and the unlabeled training data is small, and
when predetermined image data, on which an object of age estimation is taken, is inputted, the dimension compression unit applies dimension compression to the image data and outputs the image data as the low dimensional data to the identification unit, and the identification unit estimates an age of the object on the image data on the basis of the dimension compression low dimensional data and the learned parameter.

2. The apparatus according to claim 1, wherein the loss function is a function defined on the basis of the error, the term and a weighting function which is a function of age for determining an age group in which the error is small.

3. The apparatus according to claim 2, comprising
an evaluation unit for evaluating the age of the object, outputted from the identification unit, as a result of the age estimation on the basis of an error evaluation formula and selecting and setting one or both of parameters with the minimum errors, used in the dimension compression unit and the identification unit, on the basis of a result of the evaluation, wherein
an age evaluation formula is a function defined on the basis of an error between an age which is correct in the labeled training data and an age estimated by the identification unit and a weighting function which is a function of age, for determining an age group in which the error is small.

4. The apparatus according to claim 2, wherein the weighting function is defined on the basis of a standard deviation of each perceptual age.

5. The apparatus according to claim 2, wherein the smaller the value of the weight function is, the more significant the effect of the estimated age error.

6. An age estimation method for estimating an age of an object on image data, comprising:
a dimension compression step of applying dimension compression to the image data to output low dimensional data;
a clustering step of performing clustering of the low dimensional data outputted;
a labeling step that applies a correct age to a part of each clustered low dimensional data to form labeled training data and unlabeling the low dimensional data other than representative data to form unlabeled training data; and
a first setting step for setting a learned parameter learned by minimizing a value of a loss function in an identification device, wherein
the loss function is a function defined on the basis of an error between an age which is correct in the labeled training data and an age estimated by the identification device and a term which is increased when a difference between an age estimated from the labeled training data and an age estimated from the unlabeled training data is large even though a distance between the labeled training data and the unlabeled training data is small, and
when predetermined image data, on which an object of age estimation is taken, is inputted, dimension compression is applied to the image data, the image data is outputted to the identification device as the low dimensional data, and the identification device estimates an age of the object on the image data on the basis of the dimension compression-applied low dimensional data and the learned parameter.

7. The method according to claim 6, wherein
the loss function is a function defined on the basis of the error, the term and a weighting function which is a function of age, for determining an age group in which the error is small.

8. The method according to claim 7, further comprising:
an evaluation step for evaluating the age of the object, outputted from the identification device as a result of the age estimation by an error evaluation formula, and selecting and setting one or both of the parameters with the minimum errors used in the dimension compression and the identification device by the result of the evaluation, wherein
the error evaluation formula is a function defined by an error between an age which is correct in the labeled training data and an age estimated by the identification unit and a weighting function which is a function of age for determining an age group in which the error is small.

9. The method according to claim 7, wherein the weighting function is a function representing a deviation of each perceptual age.

10. The method according to claim 7, wherein
the weighting function is a function representing that the smaller a value of the weighting function is, the more significant the effect of an estimated age error.

11. A non-transitory computer-readable recording medium having an age estimation program that estimates an age of an object on image data recorded, wherein a computer is caused to execute
dimension compression processing of applying dimension compression to the image data to output low dimensional data;
clustering processing of performing clustering of the low dimensional data outputted;
labeling processing that applies a correct age to a part of each clustered low dimensional data to form labeled training data and unlabeling the low dimensional data other than representative data to form unlabeled training data; and
first setting processing of setting a learned parameter learned by minimizing a value of a loss function, wherein
the loss function is a function defined on the basis of an error between an age which is correct in the labeled training data and an age estimated by the identification unit and a term which is increased when a difference between an age estimated from the labeled training data and an age estimated from the unlabeled training data is large even though a distance between the labeled training data and the unlabeled training data is small, and
when predetermined image data, on which an object of age estimation is taken, is inputted, the computer is caused to apply dimension compression to the image data to form the low dimensional data and execute age estimation processing of estimating an age of the object on the image data on the basis of the low dimensional data and the learned parameter.

12. The computer-readable recording medium according to claim 11, wherein
the loss function is a function defined on the basis of the error, the term and a weighting function which is a function of age, for determining an age group in which the error is small.

13. The computer-readable recording medium according to claim 12, wherein the computer is further caused to execute:
an evaluating processing of evaluating the age of the object, outputted as a result of the age estimation by an error evaluation formula and selecting and setting one or both of parameters with the minimum errors used in the dimension compression and the age estimation by a result of the evaluation, and
an age evaluation formula is a function defined on the basis of an error between an age which is correct in the labeled training data and an age estimated and a term which is increased when a difference between an age estimated from the labeled training data and an age estimated from the unlabeled training data is large even though a distance between the labeled training data and the unlabeled training data is small.

14. The computer-readable recording medium according to claim 12, wherein the computer is caused to execute processing of defining the weighting function on the basis of a standard deviation of each perceptual age.

15. The computer-readable recording medium according to claim 12, wherein the weighting function is a function representing that the smaller the value of the weighting function is, the more serious the estimated age error.

* * * * *